3,155,488
CONTROLLING UNDESIRABLE PLANT GROWTH
Albert W. Lutz, Princeton, N.J., Ralph G. Child, Pearl River, N.Y., and Bryant L. Walworth, Pennington, N.J., assignors to American Cyanamid Company, Stamford, Conn., a corporation of Maine
No Drawing. Filed Dec. 3, 1962, Ser. No. 241,503
4 Claims. (Cl. 71—2.5)

The present invention relates to novel substituted tetrazines and to methods for their preparation. More particularly, it relates to substituted s-tetrazines represented by the formula:

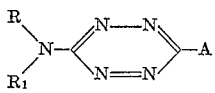

wherein R and $R_1$ stand for either hydrogen, lower alkyl or alkenyl radicals of from one to four carbon atoms, and A represents the grouping: —$SR_2$ or

wherein $R_2$ represents either a lower alkyl or a lower alkenyl radical, and $R_3$ stands for hydrogen, lower alkyl or lower alkenyl.

The substituted tetrazines of the present invention find utility as herbicides. They are particularly effective as pre- and post-emergence herbicides.

In the preparation of a 3-alkylthio-6-amino-s-tetrazine according to the present invention, a 3,6-bis-alkylthio-s-tetrazine is conveniently subjected to the action of either ammonia or an amine, such as monomethylamine or dimethylamine. In general, an excess of ammonia or the amine and the aforementioned symmetrical s-tetrazine are reacted over a period from one to about fifteen hours at temperatures from about 50° C. to about 100° C. For optimum yields, temperatures from about 70° C. to about 80° C. and a reaction time from five to ten hours are employed.

The 3,6-bis-dialkylamino-s-tetrazine compounds of the present invention can conveniently be prepared by either of two procedures. First, 3-methylthio-6-dialkylamino-s-tetrazine is subjected to the action of an additional mol of ammonia or an alkylamine under an elevated temperature and superatmospheric pressure within the range of from about 110° C. to 150° C. and a pressure of from about 50 p.s.i. to 400 p.s.i., respectively, whereby the corresponding dialkylamino-s-tetrazine is obtained. Dialkylamino-s-tetrazine can also be prepared by subjecting a thiosemicarbazide to the action of an alkyl halide at a temperature of about 75° C. for four hours, and thereafter converting the resultant isothiosemicarbazide hydrohalide to the corresponding diamino-s-tetrazine. This is accomplished by adjusting the pH of the resultant isothiosemicarbazide hydrohalide to between 8 and 9 so as to effect ring closure whereby the corresponding 3,6-bis-dialkylamino-s-tetrazine is recovered in good yield and purity.

Illustrative disubstituted alkylthio- or alkenylthio-s-tetrazine reactants which can be employed in the present invention, include:

3,6-bis-methylthio-s-tetrazine,
3,6-bis-ethylthio-s-tetrazine,
3,6-bis-propylthio-s-tetrazine,
3,6-bis-isopropylthio-s-tetrazine,
3,6-bis-butylthio-s-tetrazine,
3-methylthio-6-ethylthio-s-tetrazine,
3-propylthio-6-n-butylthio-s-tetrazine, and
3,6-bis-allylthio-s-tetrazine.

Exemplary of the amine reactants are: ammonia, monomethylamine, dimethylamine, monoethylamine, diisopropylamine, dibutylamine, monoallylamine, diallylamine and equivalents thereof. Preferably, the amine reactant is employed in its anhydrous form.

The invention will be further illustrated by the following examples which are not to be taken as limitative thereof. Unless otherwise noted, the parts given are by weight.

EXAMPLE 1

Preparation of 3-Methylthio-6-Dimethylamino-s-Tetrazine 3,6-bis-methylthio-s-tetrazine (0.50 part) is added to a solution of 5 parts of anhydrous dimethylamine in 20 parts (by volume) of absolute ethanol in a vessel which is sealed and heated in an oil bath at 70° C. to 75° C. for seven hours. The reaction mixture is then evaporated to dryness, extracted with boiling petroleum ether until the extracts are colorless, and the combined extracts are concentrated and chromatographed on Woelm alumina.

Employing as eluent a mixture of petroleum ether and benzene, 0.032 part of red needles is obtained and identified as impure 3,6-bis-dimethylamine-s-tetrazine, corresponding to 10.9% yield.

Later fractions give 0.261 part of orange-red needles (53.3% yield) which, when recrystallized from petroleum ether, have a melting point of 38.5° C.–40.5° C. A sample which has a melting point of 37° C. to 38.5° C. analyzes as follows: Calculated for $C_5H_9N_5S$: C, 34.83; H, 5.31; N, 40.80; S, 18.95. Found: C, 35.07; H, 5.30; N, 40.92; S, 18.73.

EXAMPLE 2

Preparation of 3-Methylthio-6-Diethylamino-s-Tetrazine

Following the procedure of Example 1 above, the 3-methylthio-6-diethylamino-s-tetrazine is prepared by employing diethylamine in lieu of dimethylamine utilized therein. Diethylamine (1.2 mols) is heated in the presence of 1 mol of 3,6-bis-methylthio-s-tetrazine at 50° C.–100° C. for five to ten hours in ethanol as a solvent. A good yield of 3-methylthio-6-diethylamino-s-tetrazine is recovered from the reaction mixture.

In a similar manner 3-methylthio-6-(sec.butylamino)-s-tetrazine is obtained in good yield by employing sec.butylamine in lieu of the diethylamine reactant.

EXAMPLE 3

Preparation of 3,6-Bis-Dimethylamino-s-Tetrazine

One part of 3-methylthio-6-dimethylamino-s-tetrazine is added to a solution of 5 parts of dimethylamine in 20 parts (by volume) of absolute ethanol. The mixture is then added to an autoclave. The latter is maintained at about 15° C. and at a pressure of 360 p.s.i. for about ten hours. Resultant reaction mixture is then removed from the autoclave, evaporated to dryness and extracted with boiling petroleum ether until the extracts are colorless. The combined extracts are concentrated and identified as 3,6-bis-dimethylamino-s-tetrazine, which is recovered in an amount equal to about 75 percent yield based on the theoretical.

EXAMPLE 4

Preparation of 3,6-Bis-Dimethylamino-s-Tetrazine 12.4 parts of dimethylthiosemicarbazide are suspended in 150 parts of ethanol and the mixture is refluxed with 21.3 parts of methyliodide on a steam bath for four hours. Resultant mixture is filtered to remove slight sediment and is then concentrated under vacuum on a steam bath to a thick yellow oil identified as N,N-dimethyl S-methyl isothiosemicarbazide. The latter is dissolved in 15 parts of water and is then adjusted to a pH between 8 and 9 with 0.1 N sodium hydroxide. Thereafter, the mixture is allowed to stand in an open vessel.

After standing for approximately 40 hours, while maintaining the pH at a range between 8 and 9, resultant deep red colored mixture is cooled and filtered. Long red needles are recovered as a residue, are washed with cold water and dried. The product obtained in an eleven percent yield is identified as 3,6-bis-dimethylamino-s-tetrazine having a melting point between 121° C. and 123° C. The latter product is soluble in benzene, methyl isobutyl ketone and in hot water. Upon analysis, the following data is obtained in percent for $C_6H_{12}N_6$: Calculated: C, 42.84; H, 7.19; N, 49.97. Found: C, 42.80; H, 6.72; N, 48.86.

In the examples below, the s-tetrazine derivatives of the present invention are shown to possess markedly enhanced herbicidal activity.

EXAMPLE 5

The post-emergence herbicidal effectiveness of the compounds of the present invention illustrated by 3,6-bis-dimethylamine-s-tetrazine, is shown in the following manner:

A solution of the s-tetrazine compound in 50% acetone and 50% water is prepared in various concentrations and applied to a variety of plant species. Sufficient quantities of solutions are prepared to provide the equivalents of 12.5, 5 and 1 pound of the active herbicidal compound per acre when sprayed to run off on the several plants.

The plants are approximately two weeks old when sprayed. Treated plants are then placed on greenhouse benches and the results are observed and recorded two weeks after treatment. These data are tabularized in Table I below.

TABLE I

| Test Species | Herbitoxicity [1] of 3,6-Bis-Dimethylamino-s-Tetrazine | | |
|---|---|---|---|
| | 12.5 lbs./A. | 5 lbs./A. | 1 lb./A. |
| Canada Thistle | 5 | | |
| Millet | 5 | 5 | 0 |
| Wheat | 2 | | |
| Radish | 5 | | |
| Tomato | 5 | | |
| Mustard | | 5 | 0 |
| Pigweed | | 5 | 5- |
| Purslane | | 5 | 0 |
| Crabgrass | | 5- | 0 |
| Wild Oats | | 2 | 0 |
| Barnyard grass | | 5- | 0 |
| Bindweed | | 5- | 0 |

[1] Herbitoxicity Index: 0=no apparent effect; 1=slight injury; 2=moderate injury; 3=severe injury, no plants killed; 3+=severe injury, up to 50% plants killed; 4=severe injury, 50 to 75% plants killed; 4+=severe injury, 75 to 95% plants killed; 5-=severe injury, 95 to 100% plants killed; 5=all plants killed.

EXAMPLE 6

The pre-emergence herbicidal activity of the compounds of the present invention is demonstrated in the following test:

A variety of plant seeds is separately mixed with approximately one-half pint portions of potting soil. These seed-soil mixtures are planted on top of about one inch potting soil in separate pint cups and watered with 25 milliliters of water and further with 25 milliliters of a solution containing a quantity of active ingredient equal to 25, 5 and 1 pounds per acre for each treatment. The solution is prepared by adding to a 50% acetone/water mixture 0.2 part by weight of an alkyl aryl sodium sulfonate as the surface-active agent.

Active ingredients employed in the tests are set forth in the table below along with the test seed species and the accompanying results. After treatment, the cups are placed in a greenhouse for three weeks. Pre-emergence herbicidal data in Table II below clearly illustrate the effectiveness of the s-tetrazine derivatives of the present invention.

Compounds (1), (2) and (3) set forth in Table II below are, respectively: 3,6-bis(dimethylamino)-s-tetrazine, 3-methylthio-6-dimethylamino-s-tetrazine and 3-methylthio-6-(sec.butylamino)-s-tetrazine.

TABLE II

| Test Species | Herbitoxicity Index [1] | | | | |
|---|---|---|---|---|---|
| | Compound (1), 25 lbs./A. | Compound (2), lbs./A. | | | Compound (3), 5 lbs./A. |
| | | 25 | 5 | 1 | |
| Wheat | 1 | | | | |
| Radish | 5 | | | | |
| Mustard | | 5 | 5 | 1 | 5- |
| Millet | 5 | 5 | 5 | 5- | 5 |
| Pigweed | 5 | 5 | 5 | 3+ | 5 |
| Purslane | | 5 | 5 | 1 | 5 |
| Crabgrass | | 5 | 5 | 1 | 5- |
| Wild Oats | | 5 | 2 | 1 | 2 |
| Lambsquarters | | 5 | 5- | 1 | 5- |
| Watergrass | | 5 | 5- | 0 | 5- |

[1] Herbitoxicity Index: See Table I for definition.

Advantageously, the herbicidal compositions are prepared by admixing the active compound with an inert carrier material of the type or kind referred to in the art as pest control adjuvants in solid or liquid form. Typical carriers include the talcs, clays, pumice, silica, chalk, diatomaceous earth, walnut shell flour and equivalents thereof.

Liquid compositions may be prepared by dissolving the active compound in water or by initially dissolving in common organic solvents and then admixing the resultant solutions with water either with or without an emulsifying agent. The s-tetrazine compounds are quite soluble in common organic solvents, such as acetone, methyl isobutyl ketone, ethanol, dioxane and isopropyl acetate.

Emulsifying or surface-active agents which can be employed herein, are those normally employed for the preparation of oil-in-water emulsions. Illustrative of the latter are ionic and non-ionic dispersing or emulsifying agents, such as the higher alkyl aryl sulfonates or polyglycol ether, which are commercially available. The emulsifying agent is generally employed in small concentrations in the range of from about 0.1% to 2% by weight of the total weight of the composition.

The compounds of the present invention may be applied either as a spray or as a dust to the area or locus to be protected from undesirable plant growth. The amount of the s-tetrazine compound in the herbicidal composition will, of course, vary in the manner and purpose for which the composition is to be employed. Concentrates for subsequent use in preparing spray formulations may contain as much as 90%, or more, by weight of the active ingredient. Sprays or dusts for direct use will be relatively dilute, in some cases as low as 0.5%, or less.

We claim:
1. A method for the control of undesirable plant growth which comprises: applying to an area to be protected from such growth a s-tetrazine of the formula:

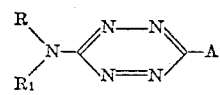

wherein R and $R_1$ are radicals selected from the group consisting of hydrogen, lower alkyl and lower alkenyl, A represents a substituent selected from the group consisting of —SR$_2$ and

wherein R$_2$ is a radical selected from the group consisting of lower alkyl and lower alkenyl and R$_3$ is a substituent selected from the group consisting of hydrogen, lower alkyl and lower alkenyl, in an amount sufficient to effect herbicidal action.

2. The method of claim 1, wherein the s-tetrazine derivate is: 3,6-bis-dimethylamino-s-tetrazine.

3. The method of claim 1, wherein the s-tetrazine derivative is: 3-methylthio-6-dimethylamino-s-tetrazine.

4. The method of claim 1, wherein the s-tetrazine derivative is: 3-methylthio-6-(sec.butylamino)-s-tetrazine.

References Cited in the file of this patent

UNITED STATES PATENTS

| | | |
|---|---|---|
| 2,369,371 | Seiberlich | Feb. 13, 1945 |
| 2,817,662 | Carboni | Dec. 24, 1957 |
| 2,964,524 | Tolkmith | Dec. 13, 1960 |
| 3,037,853 | Luckenbaugh | June 5, 1962 |
| 3,043,675 | Steinhards et al. | July 10, 1962 |

FOREIGN PATENTS

| | | |
|---|---|---|
| 866,741 | France | Aug. 30, 1941 |

OTHER REFERENCES

Stolle et al.: "J. Pract. Chem.," vol. 132, p. 209 (1931).
Erickson et al.: The Chem. of Heterocyclic Compounds, Interscience Pubs., Inc., New York, 1956, pp. 194–197.

UNITED STATES PATENT OFFICE
CERTIFICATE OF CORRECTION

Patent No. 3,155,488                                  November 3, 1964

Albert W. Lutz et al.

It is hereby certified that error appears in the above numbered patent requiring correction and that the said Letters Patent should read as corrected below.

Column 2, line 58, for "15° C." read -- 115° C. --.

Signed and sealed this 6th day of April 1965.

(SEAL)
Attest:

ERNEST W. SWIDER                                 EDWARD J. BRENNER
Attesting Officer                                      Commissioner of Patents